(12) United States Patent
Pichetti et al.

(10) Patent No.: US 11,276,405 B2
(45) Date of Patent: Mar. 15, 2022

(54) INFERRING SENTIMENT TO MANAGE CROWDED SPACES BY USING UNSTRUCTURED DATA

(71) Applicant: International Business Machines Corporation, Armonk, NY (US)

(72) Inventors: Luigi Pichetti, Rome (IT); Alessandro Donatelli, Rome (IT); Giuseppe Ciano, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 16/880,843

(22) Filed: May 21, 2020

(65) Prior Publication Data

US 2021/0366486 A1 Nov. 25, 2021

(51) Int. Cl.
*G10L 15/26* (2006.01)
*G10L 15/06* (2013.01)
*G06N 5/04* (2006.01)

(52) U.S. Cl.
CPC .............. *G10L 15/26* (2013.01); *G06N 5/04* (2013.01); *G10L 15/063* (2013.01); *G10L 2015/0631* (2013.01); *G10L 2015/0635* (2013.01)

(58) Field of Classification Search
CPC . G10L 15/22; G10L 15/1815; G10L 15/1822; G10L 25/63; G10L 15/18; G10L 2015/223; G10L 15/063; G10L 15/183; G10L 25/66; G10L 13/10; G10L 15/16; G10L 15/24; G10L 15/30; G10L 2015/225; G10L 13/033; G10L 15/02; G10L 15/197; G10L 2015/0631; G10L 2015/0638; G10L 2015/226; G10L 2015/227; G10L 25/48; G10L 25/51; G10L 25/54; G10L 25/90; G10L 13/0335; G10L 13/04;
(Continued)

(56) References Cited

U.S. PATENT DOCUMENTS 8,930,187 B2   1/2015  Kiss et al.
11,056,114 B2 *  7/2021  Hatfield .............. G06F 16/9032
(Continued)

FOREIGN PATENT DOCUMENTS

CN    108882454    11/2018
JP    2011129977   6/2011

*Primary Examiner* — Matthew H Baker
(74) *Attorney, Agent, or Firm* — Anthony Curro

(57) ABSTRACT

Facilities of a shared environment are automatically optimized by inferring sentiment from unstructured conversational data towards various environmental entities such as heat, light, service levels, etc. Conversational audio streams from different areas are analyzed to identify an entity and associated sentiment, and a heatmap is created representing the sentiment across the different areas. The conversational audio streams are captured by directional microphones and are assigned metadata such as a location tag indicating a position of a microphone within the shared environment. Heatmap creation can be supplemented by other sensory data. A cognitive system is used to generate actions for control of the facilities based on the heatmap. A suggested action may still be subject to operational policies for the facility. In some scenarios a first suggested facility action compensates for an effect of a second suggested facility action.

20 Claims, 6 Drawing Sheets

(58) Field of Classification Search
CPC ... G10L 13/047; G10L 15/08; G10L 15/1807; G10L 15/28; G10L 17/06; G10L 17/26; G10L 2015/0635; G10L 2015/088; G10L 2015/228; G10L 2025/783; G10L 21/028; G10L 21/0316; G10L 21/10; G10L 25/78; G10L 25/87; G10L 13/02; G10L 13/027; G10L 15/00; G10L 15/04; G10L 15/07; G10L 15/20; G10L 15/25; G10L 15/32; G10L 2025/906; G10L 25/06; G10L 25/93; G10L 15/26

See application file for complete search history.

(56) References Cited

U.S. PATENT DOCUMENTS

| | | | |
|---|---|---|---|
| 2009/0319436 A1 | 12/2009 | Andra et al. | |
| 2018/0114140 A1* | 4/2018 | Chen | G06F 16/9024 |
| 2018/0226072 A1* | 8/2018 | Gorzela | H04L 51/32 |
| 2018/0276197 A1 | 9/2018 | Nell et al. | |
| 2019/0332676 A1 | 10/2019 | Wooters | |
| 2019/0353378 A1* | 11/2019 | Ramamurti | F24F 11/30 |
| 2019/0384865 A1* | 12/2019 | Jaiswal | H04L 67/10 |
| 2020/0234220 A1* | 7/2020 | Ma | H04L 9/3247 |
| 2020/0341436 A1* | 10/2020 | Saxena | G05B 19/042 |
| 2021/0151037 A1* | 5/2021 | Christensen | G06F 40/30 |
| 2021/0287668 A1* | 9/2021 | Stelmar Netto | G06F 16/26 |

\* cited by examiner

INFERRING SENTIMENT TO MANAGE CROWDED SPACES BY USING UNSTRUCTURED DATA

BACKGROUND OF THE INVENTION

Field of the Invention

The present invention generally relates to management of a shared environment, and more particularly to intelligent automation for environmental control.

Description of the Related Art

Computer systems are continually becoming more involved with day-to-day human activities. One area in particular where this has occurred is management of shared environments like buildings or homes. For example, a building management system can use a computer-controlled framework installed in a building that monitors and adjusts the building's mechanical and electrical equipment such as ventilation, lighting, power, fire protection, and security. Another example is the smart home having a similar system to control lighting, climate, entertainment systems, and appliances, as well as aspects of home security such as entry/exit control and alarm systems. These environmental management systems are further enhanced by providing network connectivity, e.g., access to the Internet which offers a plethora of ancillary services.

Many smart homes are also equipped with smart speakers which provide a human-computer interface allowing the occupant to issue commands and queries to the home management system. An individual might have certain pre-programmed settings for various ambient conditions and facilities in the home that can be selected using the smart speakers. For example, when the individual first wakes up in the morning they might instruct the smart speakers to "get ready for breakfast" which results in the automated system retracting curtains over the windows, turning on certain lights (e.g., the kitchen), turning on the television, and instructing other smart appliances such as telling an electric kettle to bring its water reservoir to boiling.

The smart speaker interface uses speech recognition software to convert the individual's spoken commands/queries into text. This text is then analyzed using some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering systems such as the IBM Watson™ cognitive technology (IBM and all IBM-based trademarks and logos are trademarks or registered trademarks of International Business Machines Corporation and/or its affiliates).

NLP can also involve relationship extraction, i.e., detecting semantic information such as entities and keywords, and sentiment analysis. Sentiment can generally be thought of as positive or negative, or somewhere in between (neutral), i.e., whether a person is commenting favorably or unfavorably on a topic. There may be finer gradations or particular contexts for sentiment. Sentiment analysis is useful for a wide variety of applications such as reviews from consumers and document ranking (e.g., news articles) with respect to a particular entities.

SUMMARY OF THE INVENTION

The present invention in at least one embodiment is generally directed to a method of managing facilities of a shared environment by receiving a plurality of conversational audio streams from different areas in the shared environment, analyzing the conversational audio streams to identify at least one environmental entity and sentiment associated with the environmental entity for one or more of the different areas, creating a heatmap of the shared environment representing the sentiment for the environmental entity across the different areas, and generating at least one action for control of at least one of the facilities to optimize the environmental entity based on the heatmap. In some implementations the creation of the heatmap is supplemented by other sensory data from the shared environment. The recommended actions can be generated by a cognitive system trained with sample heatmaps for the environmental entity, each sample heatmap having an associated label indicating ideal facility actions. A suggested action may still be subject to certain operational policies for the facility. In the illustrative implementation the conversational audio streams correspond to respective microphones and a given conversational audio stream has associated therewith one or more tags containing metadata relating to a given microphone including a location tag indicating a position of the given microphone within the shared environment. The conversation analysis can identify a plurality of environmental entities, and a heatmap can be created for each entity, or a composite heatmap can be generated, and there can be multiple recommended actions for control of multiple facilities. In some scenarios a first one of the multiple actions compensates for an effect of a second one of the multiple actions.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Nowadays it can be very hard to satisfy the needs of all of the people in a shared environment. What one person requires may not be right for another or vice-versa. The feeling of a person regarding their surroundings or a simple psycho-physical need is a type of information that is not always possible to extrapolate from explicit sources due to the fact that very often it is needed in a precise instant or it is physically personal. One typical scenario of a shared environment is a restaurant. Some diners might be cold, some might not have enough light to read the menu, and some may have inadequate table service. It can be overly burdensome to constantly inquire of the diners as to their conditions and needs, and to carry out all of the actions necessary to attend to them.

It would, therefore, be desirable to devise an improved method of managing facilities in a shared environment to better address the needs of multiple users in real-time. It would be further advantageous if the method could intuitively discern those needs and automatically implement corrective action. These and other advantages are achieved in various implementations of the present invention by leveraging the unstructured data from conversations in the shared environment to infer sentiment regarding various environmental entities such as temperature, lighting, noise, or service levels. Directional microphones can be used to provide a location tag for a given conversation stream, corresponding to a particular area of the shared environment. Information gleaned from the conversation streams is used to detect sentiments that people spread across the shared environment have toward the environmental entities. An actuation system for the shared environment creates one or more heatmaps for the inferred sentiments, and an environment advisor suggests automated actions to be carried out by different facilities in the shared environment to address the sentiments, e.g., open or shut curtains or windows, adjust the thermostat for the ventilation system, raise or lower lighting, alert staff as to service/attention needed, etc. The actuation system can continually monitor the conversation steams and update the heatmaps in real-time, changing suggested actions as needed at the moment.

Figure 1:
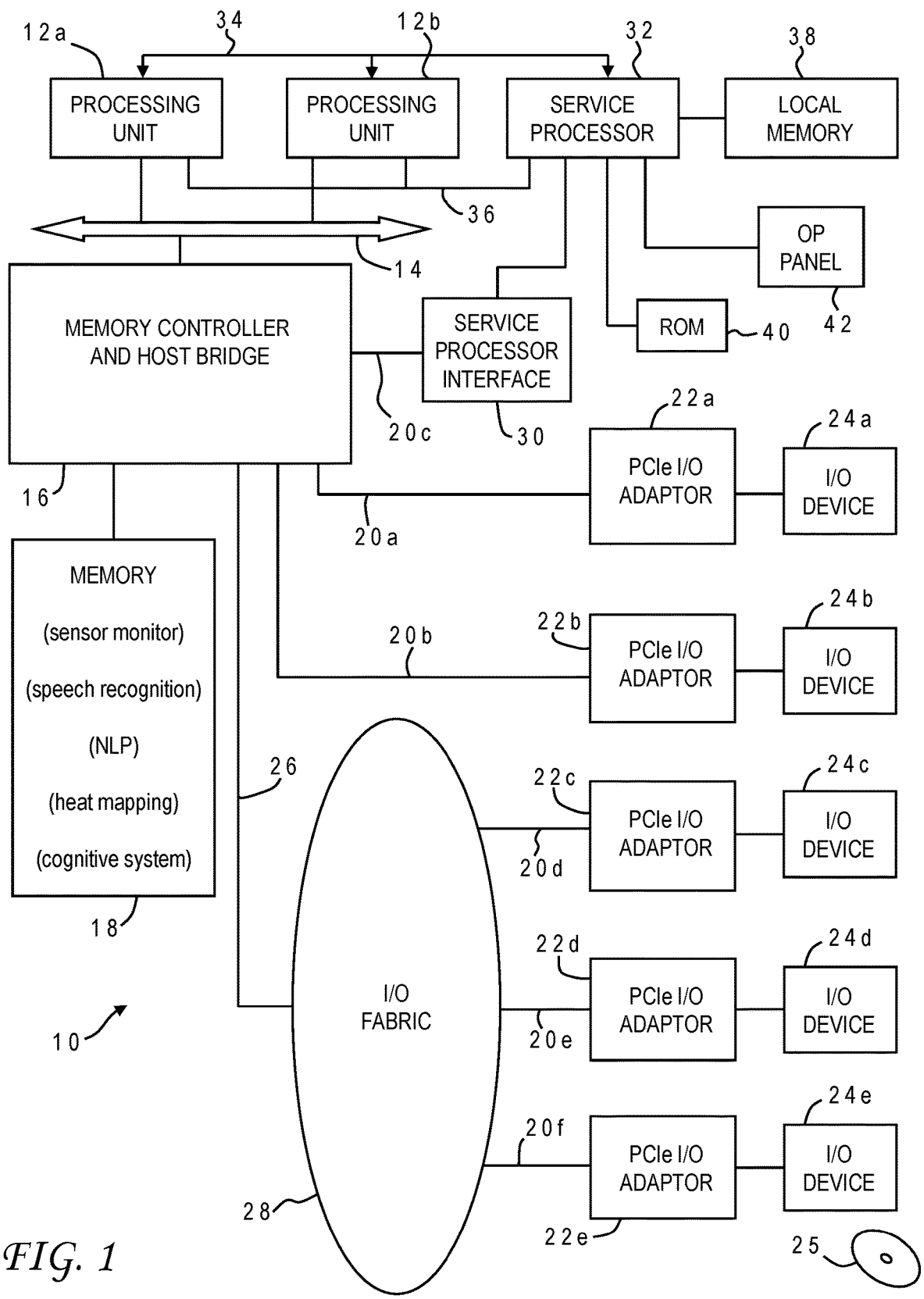
FIG. 1 is a block diagram of a computer system programmed to carry out automated management of a shared environment in accordance with one implementation of the present invention.

With reference now to the figures, and in particular with reference to FIG. 1, there is depicted one embodiment 10 of a computer system in which the present invention may be implemented to carry out facilities management for a shared environment. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications application in accordance with the present invention, including a sensor monitor, speech recognition, natural language processing, heat mapping, and a cognitive system.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed.

Executable code is loaded into memory 18 and service processor 32 releases host processors 12a, 12b for execution of the program code, e.g., an operating system (OS) which is used to launch applications and in particular the facilities management application of the present invention, results of which may be stored in a hard disk drive of the system (an I/O device 24) and provided to a facilities control system. While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a facilities management process that uses novel sentiment analysis techniques to optimize a shared environment. Accordingly, a program embodying the invention may additionally include conventional aspects of various natural language processing tools and environmental management systems, and these details will become apparent to those skilled in the art upon reference to this disclosure.

Figure 2:
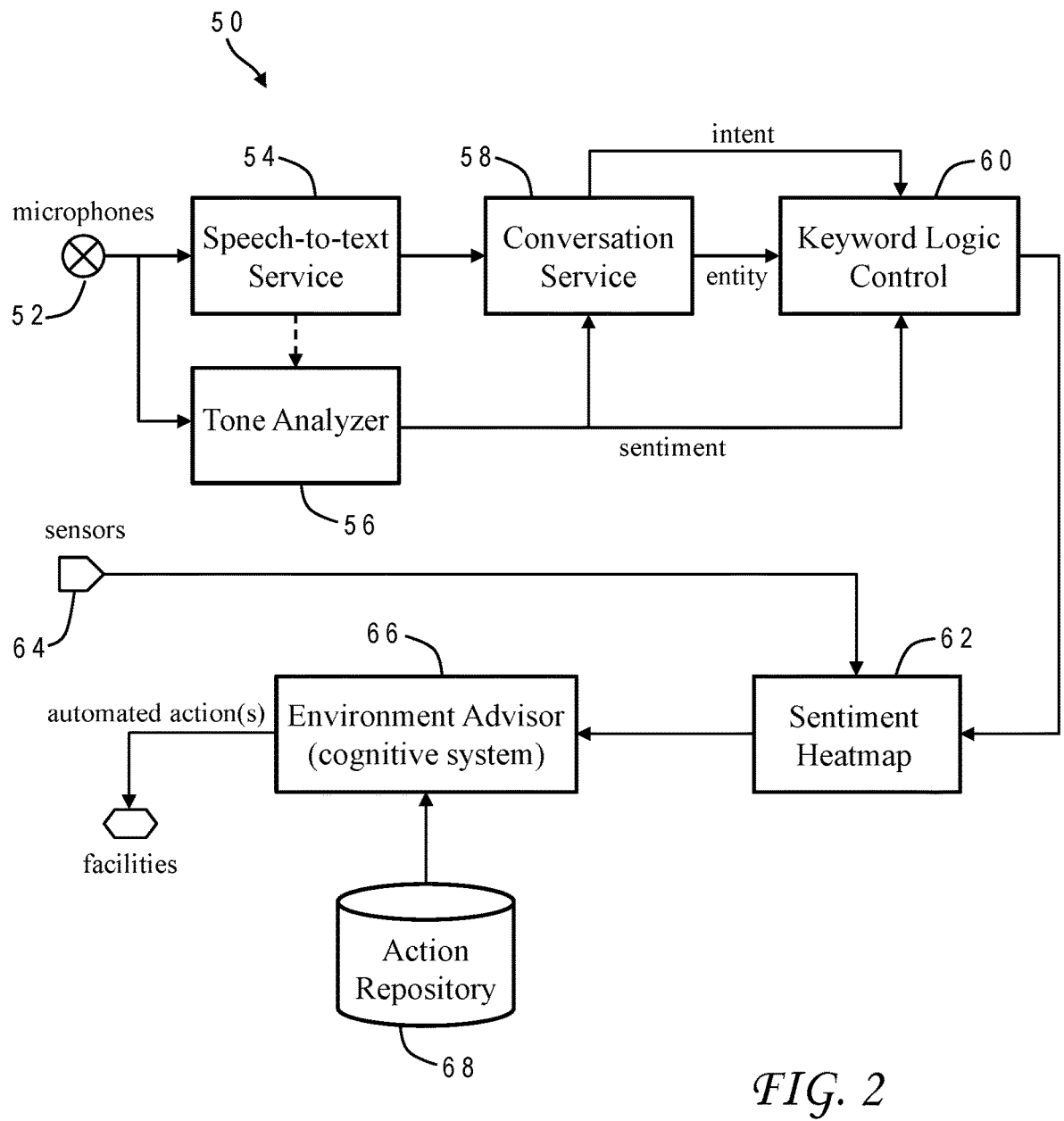
FIG. 2 is a block diagram of an actuation system for managing facilities of a shared environment in accordance with one implementation of the present invention.

Referring now to FIG. 2, there is depicted an actuation system 50 for managing facilities of a shared environment in accordance with one implementation of the present invention. The shared environment may be any setting where multiple people are likely to gather, including a house, an apartment unit, a retail establishment such as a store or restaurant, an office building, a conference center, or outdoor venues. This list is not comprehensive and should not be considered limiting as the present invention is generally applicable to any place having identifiable regions or areas that can be associated with particular environmental facilities.

Different functions of actuation system 50 can be carried out using a computer such as computer system 10. The computer may be local to the shared environment or remote therefrom, such as a cloud server communicating with a local facilities management system at the shared environment via the Internet. In some implementations certain functions may be carried out by the local system and others carried out by the cloud server, or other computing devices. Actuation system 50 relies on a plurality of microphones 52 that are distributed around the shared environment being managed to understand the users' perceptions via their spoken comments. Each microphone 52 provides an audio stream that is associated with a unique location tag. The location tag generally corresponds to a known area of the shared environment proximate the given microphone. While a microphone could be omnidirectional and positioned near the center of the location indicated by the tag, in the preferred implementation the microphones are directional and are positioned above the human interaction level of the shared environment pointing slightly downward towards the particular location associated with the tag. Actuation system 50 can assign the locations/areas using any coordinate system.

In the illustrative implementation, the tags are keyword related to specific characteristics of the environment where the microphones are installed. One example of a shared environment is a restaurant or café. Microphones 52 will be installed in the dining rooms at strategic points such as near the tables, in a garden, in a lounge, etc. Being positioned at different points in the room, they will contain sets of different metadata that will serve to capture different concepts relating to available physical facilities that might affect that those areas. For example, a microphone proximate dining tables may have tags related to the menu, the distance between the tables, the windows (if they are near the table), the amount of light, the temperature, the staff service. These examples for tags are intended to be illustrative only and should not be construed in a limiting sense as any tag can be used if it relates to some characteristic of the shared environment.

As people in the shared environment engage in conversation, conversational audio streams from different areas are captured by microphones 52 and forwarded (with their respective tags or metadata) to a speech-to-text service 54 and a tone analyzer 56. Speech-to-text service 54 converts the conversational audio stream into one or more passages of text as is known in the art. The conversation text is passed to a conversation service 58 that uses natural language processing to analyze the conversations. This analysis identifies entities in the conversations that pertain to the environment, such as temperature, light, air circulation, humidity, service levels, etc. Conversation service 58 also identifies intents that are associated with the respective entities. For example, an intent might be that the temperature is too cold, or that the lighting is insufficient. Tone analyzer 56 augments this information by deriving sentiment from the conversations, also in a known manner. The tone might reflect anger, anxiety, impatience, etc., and is used in this implementation as a way to reinforce or give more weight to a specific entity/intent, i.e., increment its priority. Tone analyzer may additionally rely on extracted text from speech-to-text service 54 so as to enrich the sentiment of a specific topic/keyword. These examples of specific sentiment and intent are exemplary only, and should not be construed in a limited sense, as each of these classes may include a wide variety of feelings and thoughts, both positive and negative.

In the preferred implementation, the conversation data is completely anonymized so as to protect the privacy of all individuals. No data is collected that can correlate a conversation with any particular individual, and once sentiment and proposed intent for an entity have been derived from a voice conversation, the original conversation file is marked for deletion without ever sharing it outside of actuation system 50.

Keyword logic control 60 associates the tags for a given microphone to the extracted and relevant text information for that conversation. The intent and sentiment are used by keyword logic control 60 to create/update a heatmap 62 for the given environmental entity. The term "heatmap" denotes a data visualization technique that shows the magnitude of an entity across an area as different colors or shades in two dimensions, and can appear similar to a contour map. While this term was originally coined to refer to only temperature, the term as used herein more broadly refers to any environmental parameter or entity. The heatmap may be analog, that is, a graphic image, or it may be digitized, e.g., a grid of the area with numerical (preferably integer) values assigned to each grid for an entity's value in that area. There can be a single heatmap for one entity, or a composite heatmap for several entities. The heatmap can further be created based in part on data from one or more sensors 64 in addition to microphones 52. The sensors may be for any ambient condition of the shared environment including temperature, light, humidity, air flow, etc.

Sentiment heatmap 62 is used by an environment advisor 66 to generate appropriate actions for managing facilities of the shared environment that relate to the environmental entities to improve/optimize the environment. Environment advisor 66 relies on an action repository 68 that contains the actions to be performed against specific environmental facilities. Exemplary actions include open/adjust/close curtains, open/close windows, increase/decrease thermostat, raise/lower lighting, background music levels, etc., but these examples should not be construed in a limiting sense as the types of actions can relate to virtually any concern or task that might arise in a shared environment. While the preferred implementation of the invention focuses on the automated control of such physical facilities, it can also be used with service-related tasks, e.g., alerting staff as to attention needed in an area, quality of products being provided, cleanliness, etc. As robotic technologies advance, these service-related matters may become fully automated as well.

While the actions suggested by environmental advisor 66 may be selected based on a set of rules (e.g., zone 1 is cold so increase heat around that zone), in the preferred embodiment environment advisor 66 uses a combination of rules and cognitive analysis, i.e., a cognitive system. A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feed-forward neural network based on animal visual perception, and so is particularly useful in processing image data. Convolutional neural networks are similar to ordinary neural networks but are made up of neurons that have learnable weights and biases. There are many alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables. A cognitive system is not limited to use of a single approach, i.e., it can incorporate any number of these machine learning algorithms.

Figure 3:
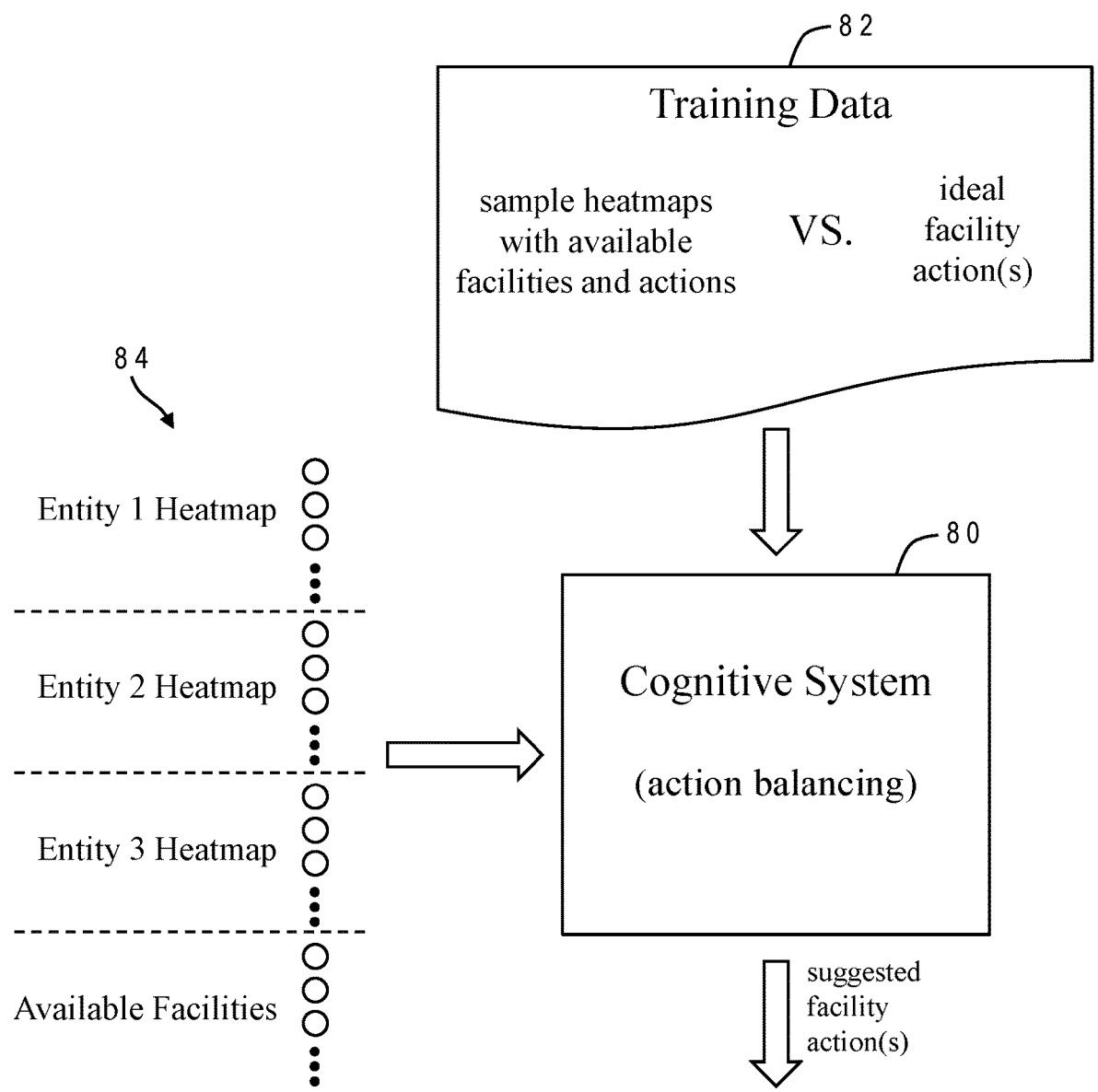
FIG. 3 is a block diagram of a cognitive system used to suggest actions to be performed for facilities of a shared environment in accordance with one implementation of the present invention.

The cognitive system used by environment advisor 66 can be trained to capture specific terms, complaints, points of discussion, etc., relating to elements of the shared environment that can be controlled. As seen in FIG. 3, a cognitive system is first enabled using training data 82. Training data 82 includes a very large number (preferably tens of thousands) of samples, each sample having one or more heatmaps of an area for various entities along with facilities at specific locations within the area that influence those entities, and available actions the facilities can undertake. Each sample is also provided with a label or "answer" indicating the ideal facility actions that should be undertaken to address any imbalances in the heatmap. The actions can be binary (on/off) or incremental. The labels can be provided by subject matter experts. Training data 82 can be further customized according to the intended application of cognitive system 80. For example, the training data can be samples of heatmaps for restaurant layouts, or heatmaps for a commercial office space having working cubicles. Once so trained, cognitive system 80 can take a current scenario input 84 including one or more heatmaps for an area along with available facilities in the area, and generate one or more suggested actions to take on the facilities.

Returning to FIG. 2, environment advisor 66 takes the suggestions from cognitive system 80 and, according to the preferred implementation, checks them against any applicable constraints or policies regarding the facilities. For example, cognitive system 80 may have advised lowering the temperature in the area by turning the thermostat down a certain number of degrees from its current setting, but there may be a policy for the area that the thermostat should never be set below 68° F. and the suggested action would violate this policy. Environment advisor 66 can accordingly modify the suggested action to mitigate this concern, in this case by limiting the lowering of the thermostat to a 68° F. minimum so it is consistent with the policy. Policies can vary according to other parameters; there might be a policy that curtains are always to be opened after a certain time in the evening. In some implementations, the final actions are provided directly to the facilities by environment advisor 66. In other implementations, environment advisor 66 forwards the final actions to a local facilities management system at the shared environment which carries out the actions in an automated fashion. The local facilities management system can optionally present the actions to a human operator at the shared environment via a console or other user interface for confirmation.

Figure 4:
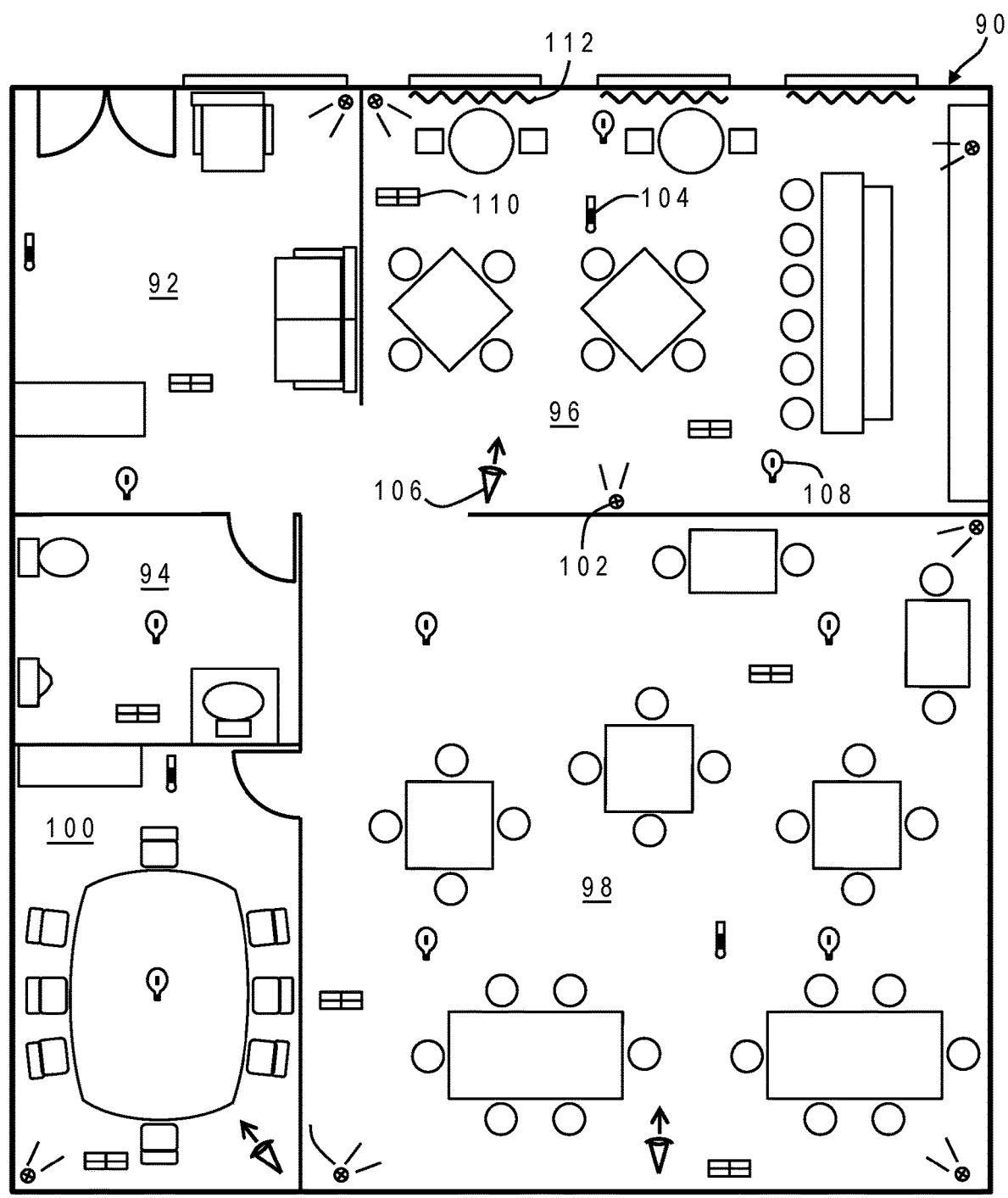
FIG. 4 is a plan view of a restaurant layout showing restaurant features, microphones, sensors and environmental facilities for different areas in accordance with an exemplary implementation of the present invention.

FIG. 4 shows an example of an environment setting 90 for carrying out the invention according to an illustrative implementation. In this example environment setting 90 is a restaurant layout having different shared spaces including an entry 92, a restroom 94, a bar 96, a main dining room 98 and a private dining room 100. Each of these spaces is equipped with certain sensors and facilities. The sensors here include microphones 102, electronic thermometers 104, and photometers 106 (not all of the sensors are numbered in order to simplify the figure). As noted above, microphones 102 are preferably directional and are placed and pointed so as to capture sound from different areas within layout 90. Even within a given one of the spaces, there can be multiple microphones for different identified areas. Bar 96 has three microphones, one in the upper left tagged "corner window bar", one in the upper right tagged "bar back" and one at the bottom tagged "bar middle". A given conversation might be captured by more than one microphone, in which case the conversational audio stream can be associated with the tags of each of the receiving microphones. Electronic thermometers 104 and photometers 106 have their own tags that similarly associate them with respective known locations within the layout.

The facilities here include light fixtures 108, air conditioning vents 110 and curtains 112 (again, not all of the facilities for layout 90 are numbered). A given space can likewise have more than one of the same facility; bar 96 has two light fixtures, two air conditioning vents and three sets of curtains. Each individual facility can be separately controlled as desired, and each is similarly tagged to at least indicate a location within layout 90. In this example, air conditioning vents 108 are actually a two-fold facility since they can include a cold/heat component (thermostat adjustment) as well as an air flow component (fan speed or louvers).

Figure 5A:
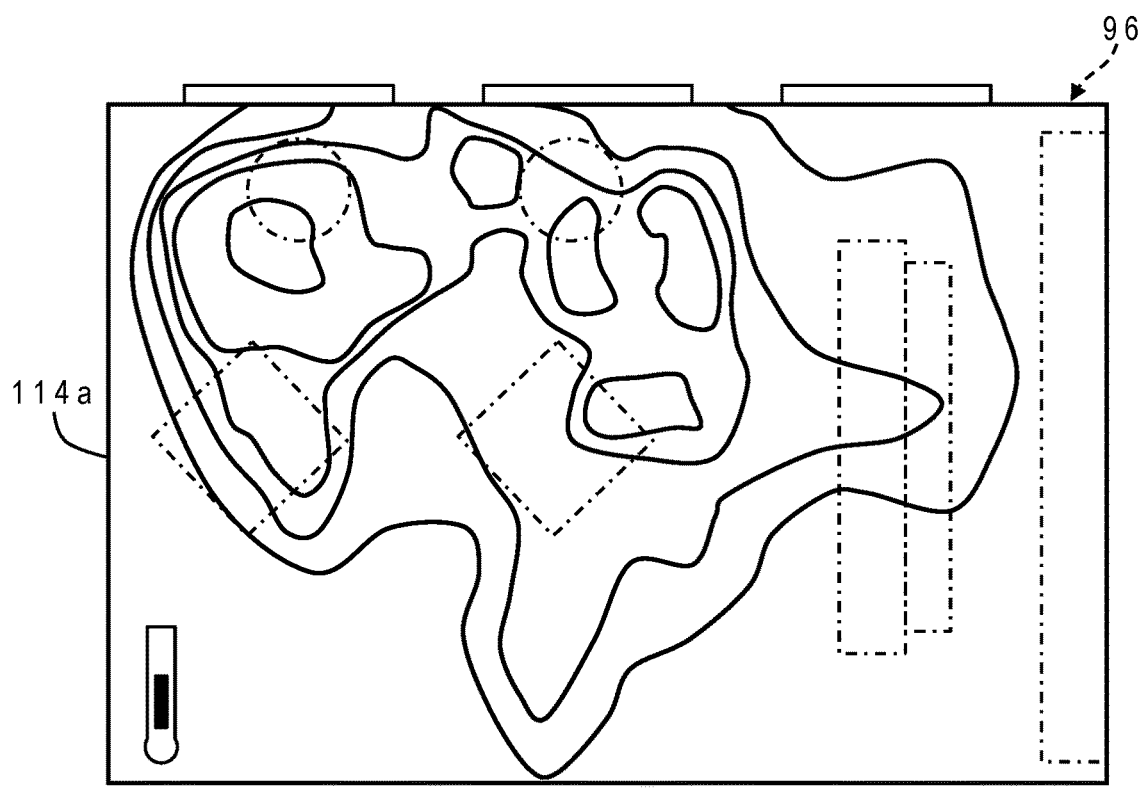
FIGS. 5A and 5B are analog and digital heatmaps of a bar area of the restaurant layout of FIG. 4 showing temperature and lighting values in accordance with an exemplary implementation of the present invention.
Figure 5B:
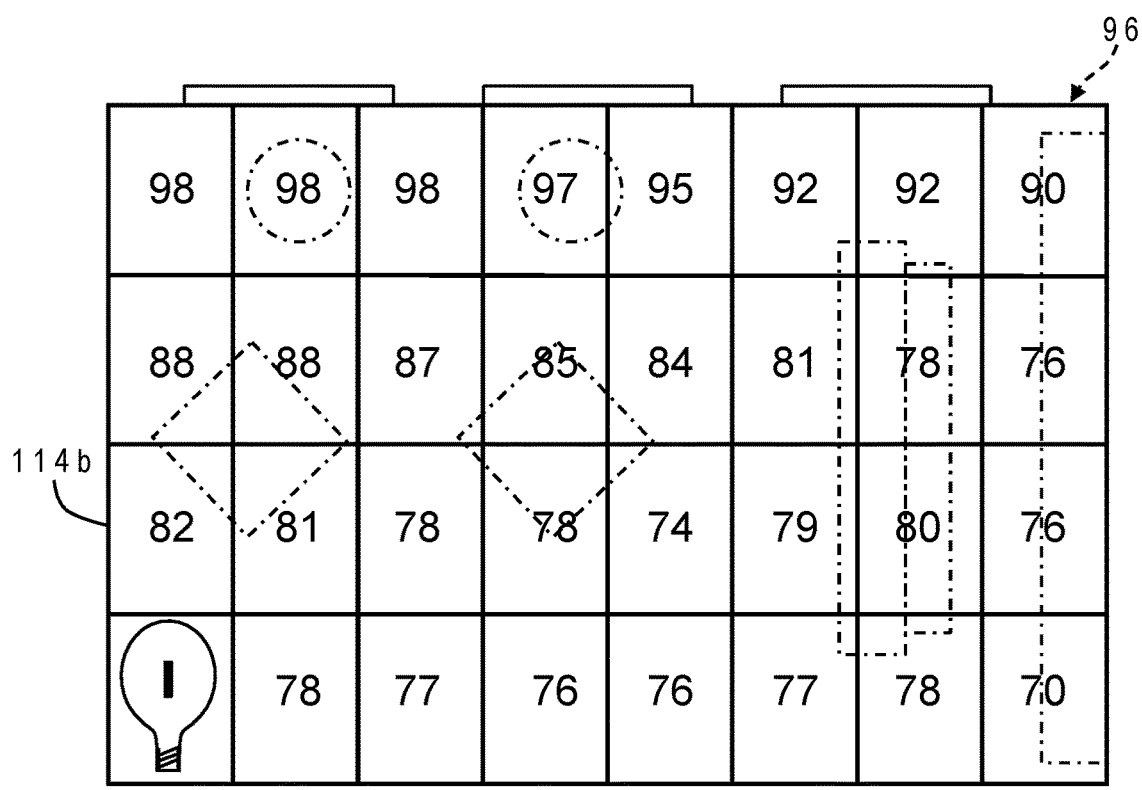

FIGS. 5A-5B are examples of what two heatmaps might look like for bar area 96 of layout 90 according to an instructive scenario. In these figures the primary features of the bar (tables and bar counter) are shown in dashed lines for orientation with FIG. 4. As noted above, a heatmap can be a graphic image or a digitized representation. In FIG. 5A a heatmap 114a is a graphic image for temperatures within bar 96 as symbolized by the thermometer icon in the lower left corner, and in FIG. 5B a heatmap 114b is a digitized grid representing ambient light as symbolized by the light bulb icon in the lower left corner. Heatmap values may be actual physical values (like temperatures) or just relative (e.g., a scale of 1 to 100).

Further to this scenario, a patron at the table in the upper left corner of bar 96 has complained to their companion that "there's so much glare I can't read the menu". The companion has in turn asked "Are you hot?". Another patron at the table in the center of bar 96 is overheard saying "It feels stuffy in here". Based on these and other comments made in bar 96 over a period of time (say, the last 15 minutes), as well as sensory data from electronic thermometers 104, keyword logic control 60 generates the temperature heatmap 114a seen in FIG. 5A. The actual heatmap 114a may be colored or shaded to provide a finer gradient. For example, the centermost closed shapes in temperature heatmap 114a can be red, the next closed shapes surrounding those can be orange, the next yellow, then green, blue and purple, with each layer blending into the next. The heatmap does not represent the physical values of a particular entity, but rather represents the sentiment toward that entity from a relative perspective based on the conversational information, possibly supplemented with sensory data. A thermometer might provide an exact indication of temperature at a specific location but if an individual at that location makes a comment whose intent is temperature-related it can bias or override the sensor reading.

Based on the same conversational information, but with different keyword extraction, as well as sensory data from photometers 106, keyword logic control 60 generates the lighting heatmap 114b seen in FIG. 5B. In this digital heatmap version, the numbers represent relative light intensity in each grid cell on a scale of 1-100, with one hundred being the brightest. Either of these heatmaps 114a, 114b can be submitted to environment advisor 66 to generate a facilities action solution, or a composite heatmap of both can be submitted. Further to this scenario, the following actions occur: the two leftmost curtains in bar 96 are moved from open to closed; the lighting fixture at the bottom of bar 96 in layout 90 is slightly brightened; the thermostat for the air conditioning vent at the upper left corner of bar 96 in layout 90 is slightly decreased, and the louvers on the other air conditioning vent near the bottom are fully opened. In an alternative to this scenario, a different set of actions is taken: all three curtains are moved from open to closed; the lighting fixture at the bottom is turned to its brightest setting, the thermostats for both air conditioning vents are slightly lowered, and the louvers for the air conditioning vent at the upper left are slightly closed. In each of these alternatives, the selected actions together affect all of lighting, temperature and air flow.

For some scenarios certain actions may be taken to counterbalance the effects of other actions. In the foregoing scenario when the curtains close it decreases overall lighting in the bar so the lighting fixture that is located opposite the windows brightens to compensate. Additionally, when air flow is adjusted for one air conditioning vent, the thermostat for the other is automatically adjusted to compensate. There are many other variations of balancing facility actions including multiple dependencies across different entities. It is not necessary to carry out multiple actions all at once, and it might be deemed preferable to spread out at least some of the actions over a short period of time. It will be appreciated that FIGS. 5A and 5B are examples for only two entities, and other sentiment heatmaps could be generated as well and used in the cognitive analysis.

Figure 6:
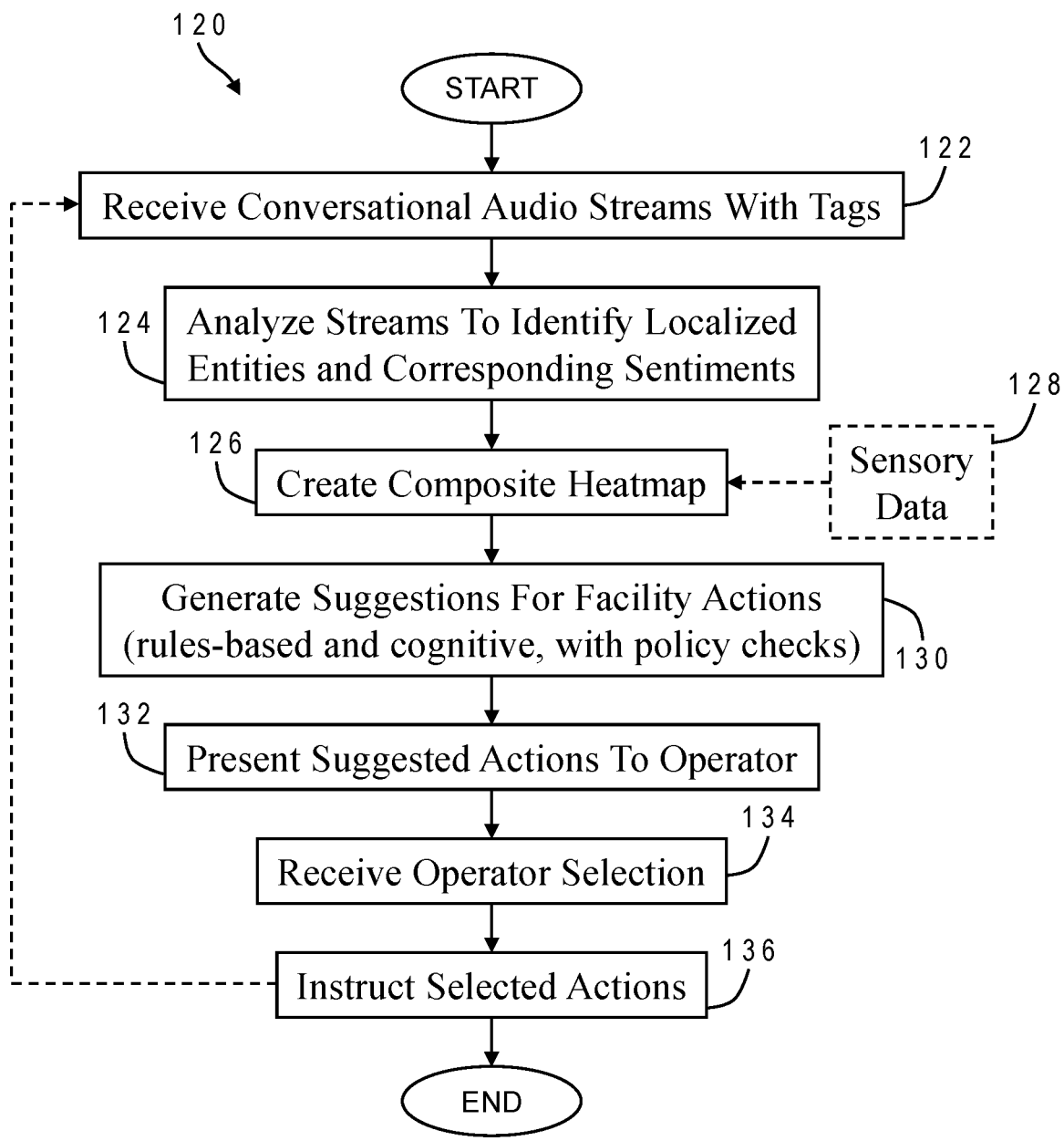
FIG. 6 is a chart illustrating the logical flow for a shared environment management process in accordance with one implementation of the present invention.

The present invention may be further understood with reference to the chart of FIG. 6 which illustrates the logical flow for a shared environment management process 120 in accordance with one implementation of the present invention. Process 120 may be carried out on a computer such as a computer system 10. Process 120 begins by receiving conversational audio streams 122. The conversational audio streams are tagged with various metadata, particularly a location tag that associates a stream with a specific location, and other tags relating to various physical parameters of the shared environment. The conversational audio streams are analyzed to identify localized entities and corresponding sentiments 124. Sentiments in this context do not have to be purely positive or negative, but can have other polar qualities such as cold/hot, bright/dark, comfortable/uncomfortable, culinary satisfaction/dissatisfaction, etc. There can also be other nuances to sentiment. For example, their may be an intent strength inferred as a likelihood that a given topic/problem is being discussed in several other environment places. An intent reach can also be based on how many people are perceived to have discussed the same entity.

A composite heatmap is then created (or updated) from the identified entities and sentiments 126. This heatmap creation can be supplemented with sensory data 128 from sensors in different areas of the shared environment. The composite heatmap becomes the basis for generating suggestions for facility actions to optimize the environmental entities according to the crowd 130. The suggestions can be based on a set of rules pertaining to the entities and facilities, or using cognitive analysis. In the preferred implementation the suggestions are also subject to any special policies for the shared environment. The suggestions can be presented to an operator at or otherwise supervising the shared environment 132. The operator can confirm, modify or cancel any of the suggestions 134. Appropriate instructions are then sent to the facilities affected by the selected actions 136.

Process 120 can repeat continuously but in order to avoid excessive thrashing of facilities it can repeat at predetermined intervals such as every 15 minutes, updating the heatmap and generating any newly required actions. In some implementations the entities and sentiments expressed in older conversations can be aggregated so the analysis can be based on more than the last 15 minutes of conversation, but the older conversational information can be phased out in various manners (forgetfulness).

The present invention thereby provides a superior solution to management of facilities in crowded spaces. This approach leverages the unstructured data in conversations in an unobtrusive manner to automatically determine the best way to optimize the environment and satisfy the needs of all of the people, or most of them. Sometimes people may not complain to the shared environment staff about a problem, but the system of the present invention can intuitively ascertain the problem and take immediate corrective action. The result is a happier clientele for the establishment, without any staff involvement.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the examples of shared environments described herein are relatively small in size, there is no real size limit. Also, the environment and facilities have been described from a two-dimensional perspective, but the present invention also applies to three-dimensional environments. It is therefore contemplated that such modifications can be made without departing from the spirit or scope of the present invention as defined in the appended claims.

What is claimed is:

1. A method of managing facilities of a shared environment comprising:
receiving a plurality of conversational audio streams from one or more different areas in the shared environment;
analyzing the received plurality of conversational audio streams to identify at least one environmental entity and a sentiment associated with the environmental entity for one or more of the different areas;
creating a heatmap of the shared environment representing the sentiment for the environmental entity across the different areas; and
generating at least one action for control of at least one of the facilities to optimize the environmental entity based on the created heatmap.

2. The method of claim 1 wherein said generating is performed by a cognitive system trained with one or more sample heatmaps for the environmental entity, each sample heatmap having an associated label indicating one or more ideal facility actions.

3. The method of claim 1 wherein said creating the heatmap includes applying sensory data from the shared environment.

4. The method of claim 1 wherein the received plurality of conversational audio streams correspond to respective microphones and a given conversational audio stream has associated therewith one or more tags containing metadata relating to a given microphone including a location tag indicating a position of the given microphone within the shared environment.

5. The method of claim 1 wherein:
said analyzing identifies a plurality of environmental entities;
said creating creates a plurality of heatmaps, one for each of the plurality of environmental entities; and
said generating generates multiple actions for control of multiple facilities.

6. The method of claim 5 wherein a first one of the multiple actions compensates for an effect of a second one of the multiple actions.

7. The method of claim 1 further comprising performing the at least one action to control the at least one facility.

8. A computer system comprising:
one or more processors which process program instructions;
a memory device connected to said one or more processors; and
program instructions residing in said memory device for managing facilities of a shared environment by receiving a plurality of conversational audio streams from one or more different areas in the shared environment, analyzing the received plurality of conversational audio streams to identify at least one environmental entity and a sentiment associated with the environmental entity for one or more of the different areas, creating a heatmap of the shared environment representing the sentiment for the environmental entity across the different areas, and generating at least one action for control of at least one of the facilities to optimize the environmental entity based on the created heatmap.

9. The computer system of claim 8 wherein the action is generated using a cognitive system trained with one or more sample heatmaps for the environmental entity, each sample heatmap having an associated label indicating one or more ideal facility actions.

10. The computer system of claim 8 wherein the creating of the heatmap includes applying sensory data from the shared environment.

11. The computer system of claim 8 wherein the received plurality of conversational audio streams correspond to respective microphones and a given conversational audio stream has associated therewith one or more tags containing metadata relating to a given microphone including a location tag indicating a position of the given microphone within the shared environment.

12. The computer system of claim 8 wherein a plurality of environmental entities are identified, a plurality of heatmaps are created, one for each of the plurality of environmental entities, and multiple actions are generated for control of multiple facilities.

13. The computer system of claim 12 wherein a first one of the multiple actions compensates for an effect of a second one of the multiple actions.

14. The computer system of claim 8 wherein the generating includes determining that the at least one action is consistent with an action policy for the at least one facility.

15. A computer program product comprising:
one or more computer readable storage media; and
program instructions collectively residing in said one or more computer readable storage media for managing facilities of a shared environment by receiving a plurality of conversational audio streams from one or more different areas in the shared environment, analyzing the received plurality of conversational audio streams to identify at least one environmental entity and a sentiment associated with the environmental entity for one or more of the different areas, creating a heatmap of the shared environment representing the sentiment for the environmental entity across the different areas, and generating at least one action for control of at least one of the facilities to optimize the environmental entity based on the created heatmap.

16. The computer program product of claim 15 the action is generated using a cognitive system trained with one or more sample heatmaps for the environmental entity, each sample heatmap having an associated label indicating one or more ideal facility actions.

17. The computer program product of claim 15 wherein the creating of the heatmap includes applying sensory data from the shared environment.

18. The computer program product of claim 15 wherein the received plurality of conversational audio streams correspond to respective microphones and a given conversational audio stream has associated therewith one or more tags containing metadata relating to a given microphone including a location tag indicating a position of the given microphone within the shared environment.

19. The computer program product of claim 15 wherein a plurality of environmental entities are identified, a plurality of heatmaps are created, one for each of the plurality of environmental entities, and multiple actions are generated for control of multiple facilities.

20. The computer program product of claim 19 wherein a first one of the multiple actions compensates for an effect of a second one of the multiple actions.

\* \* \* \* \*